(12) United States Patent
Waldin et al.

(10) Patent No.: US 7,711,719 B1
(45) Date of Patent: May 4, 2010

(54) MASSIVE MULTI-PATTERN SEARCHING

(75) Inventors: Ray Waldin, San Francisco, CA (US); Jing Zhang, Antioch, CA (US)

(73) Assignee: Palamida, Inc., San Francisco, CA (US)

( * ) Notice: Subject to any disclaimer, the term of this patent is extended or adjusted under 35 U.S.C. 154(b) by 628 days.

(21) Appl. No.: 11/277,484

(22) Filed: Mar. 24, 2006

Related U.S. Application Data

(60) Provisional application No. 60/665,422, filed on Mar. 24, 2005, provisional application No. 60/665,423, filed on Mar. 24, 2005, provisional application No. 60/776,838, filed on Feb. 23, 2006.

(51) Int. Cl.
G06F 17/30 (2006.01)

(52) U.S. Cl. .................... 707/696; 707/698; 707/715

(58) Field of Classification Search ............. 707/1–7, 707/104.1
See application file for complete search history.

(56) References Cited

U.S. PATENT DOCUMENTS

| | | | | |
|---|---|---|---|---|
| 5,644,709 | A * | 7/1997 | Austin | 714/53 |
| 5,875,318 | A * | 2/1999 | Langford | 716/3 |
| 6,054,943 | A * | 4/2000 | Lawrence | 341/87 |
| 6,092,065 | A * | 7/2000 | Floratos et al. | 707/6 |
| 6,330,576 | B1 * | 12/2001 | Mochizuki et al. | 715/223 |
| 6,385,569 | B1 * | 5/2002 | Kutsumi | 704/7 |
| 7,499,923 | B2 | 3/2009 | Kawatani | |
| 2004/0073550 | A1 * | 4/2004 | Meirovitz et al. | 707/6 |
| 2005/0120017 | A1 * | 6/2005 | Motoki | 707/5 |
| 2005/0135380 | A1 * | 6/2005 | Sahita et al. | 370/395.32 |
| 2007/0006293 | A1 * | 1/2007 | Balakrishnan et al. | 726/13 |
| 2008/0222094 | A1 * | 9/2008 | Cox | 707/3 |

OTHER PUBLICATIONS

Sun Wu , "A fast algorithm for multi-pattern searching," Technical Report TR-94-17, May 1994, pp. 1-11, Department of Computer science, University of Arizona, Arizona.*

Perl, Y., et al., "Interpolation Search—A Log Log$N$ Search," Communications of the ACM, Jul. 1978, pp. 550-553, vol. 21, No. 7, ACM.

Wu, S., et al., "A Fast Algorithm for Multi-Pattern Searching," Technical Report TR-94-17, May 1994, pp. 1-11, Department of Computer Science, University of Arizona, Arizona.

* cited by examiner

*Primary Examiner*—Don Wong
*Assistant Examiner*—Hanh B Thai
(74) *Attorney, Agent, or Firm*—Fenwick & West LLP

(57) ABSTRACT

To perform multi-pattern searching, a preprocessing engine populates a SUFFIX table, a PREFIX table and a PATTERN table. The SUFFIX table combines data conventionally stored in SHIFT and HASH tables. Pointers in the SUFFIX table refer to corresponding segments in the PREFIX table. Each PREFIX table segment is sorted by a prefix hash. A PATTERN table includes a hash of each full pattern sorted and grouped into segments, with each segment corresponding to a suffix hash and prefix hash combination. Pointers in the PREFIX table refer to corresponding segments in the PATTERN table. The PREFIX and PATTERN can be kept in secondary storage, allowing potentially billions of patterns to be used. After preprocessing, patterns are evaluated against a source file. A document metric is determine to qualitatively describe the similarity between the source file and each pattern file.

20 Claims, 9 Drawing Sheets

| Pattern Hash 704 | Pattern Metadata 706 |
|---|---|
| 0x00 | pattern 221, ... |
| 0x02 | pattern 41, ... |
| 0x03 | pattern 1, ... |
| 0x04 | pattern 707, ... |
| 0x0E | pattern 23, ... |
| 0x12 | pattern 7, ... |

Fig. 7

| Filename | Matches | Coverage | Clustering | Uniqueness | CodeRank |
|---|---|---|---|---|---|
| e:\SourceForager\ap\apache-tomcat\jakarta\tomcat-3\v3.1\jakarta-ant.tar.... | 80 | 0.924 | 0.494 | 0.517 | 0.594 |
| e:\SourceForager\ap\apache-ant\ant\apache-ant-1.5.2-src.zip/TarInputStr... | 103 | 1 | 0.888 | 0.262 | 0.569 |
| e:\SourceForager\ap\apache-ant\ant\apache-ant-1.5.4-src.zip/TarInputStr... | 102 | 1 | 0.842 | 0.258 | 0.562 |
| e:\SourceForager\ap\apache-ant\ant\apache-ant-1.5.3-1-src.zip/TarInputS... | 102 | 1 | 0.842 | 0.258 | 0.562 |
| e:\SourceForager\ap\apache-ant\ant\apache-ant-1.5.1-src.zip/TarInputStre... | 103 | 1 | 0.843 | 0.253 | 0.559 |
| e:\SourceForager\ap\apache-ant\ant\apache-ant-1.5-src.zip/TarInputStr... | 103 | 1 | 0.809 | 0.253 | 0.559 |
| e:\SourceForager\ap\apache-ant\ant\apache-ant-1.6.1-src.zip/TarInputStr... | 100 | 1 | 0.809 | 0.256 | 0.557 |
| e:\SourceForager\ap\apache-ant\ant\apache-ant-1.6.0-src.zip/TarInputStr... | 100 | 1 | 0.809 | 0.256 | 0.557 |
| e:\SourceForager\ap\apache-ant\ant\apache-ant-1.6.2-src.zip/TarInputStr... | 101 | 1 | 0.809 | 0.251 | 0.554 |
| e:\SourceForager\ap\apache-ant\ant\apache-ant-1.2-src.zip/TarInputStrea... | 78 | 0.9 | 0.497 | 0.419 | 0.553 |
| e:\SourceForager\ap\apache-ant\ant\apache-ant-1.2-bin.zip/TarInputStrea... | 78 | 0.9 | 0.497 | 0.419 | 0.553 |
| e:\SourceForager\ap\apache-ant\ant\apache-ant-1.1.zip/TarInputStream.java | 78 | 0.9 | 0.497 | 0.419 | 0.553 |
| e:\SourceForager\le\ledit-plugins\Archive-0.3.3.zip/Archive/com/ice/tar/Ta... | 23 | 0.266 | 0.189 | 0.348 | 0.265 |
| e:\SourceForager\ie\ledit-ierla2\nre9source_tar_nz/iEdit/installer/TarInputS | 73 | 0.266 | 0.189 | 0.348 | 0.265 |

```
if (numToSkip > 0) {
    this.skip(numToSkip);
} this.readBuf = null;

byte[] headerBuf = this.buffer.readRecord();

if (headerBuf == null) {
    if (this.debug) {
        System.err.println("READ NULL RECORD");
    }
    this.hasHitEOF = true;
} else if (this.buffer.isEOFRecord(headerBuf)) {
    if (this.debug) {
        System.err.println("READ EOF RECORD");
    }
    this.hasHitEOF = true;
} if (this.hasHitEOF) {
    this.currEntry = null;
} else {
    this.currEntry = new TarEntry(headerBuf);

if ((headerBuf[257] == 'u' && headerBuf[258] == 's'
      && headerBuf[259] == 't' && headerBuf[260] == 'a'
      && headerBuf[261] == 'r')) {
        this.vfFormat = true;
    } if (this.debug) {
        System.err.println("TarInputStream: SET CURRENTRY '"
            + this.currEntry.getName()
            + "' size = "
            + this.currEntry.getSize());
    } this.entryOffset = 0;
}
```

Title: Massive Multi-Pattern Searching
Inventor(s): Ray Waldin and Jing Zhang
Atty. Docket No.: 24569-10210
Sheet 9 of 9

Fig. 9

MASSIVE MULTI-PATTERN SEARCHING

CROSS-REFERENCE TO RELATED APPLICATIONS

This application claims the benefit of U.S. Provisional Application No. 60/665,422, filed on Mar. 24, 2005; and of U.S. Provisional Application No. 60/665,423, filed on Mar. 24, 2005. Both applications are incorporated by reference herein in their entirety.

This application is also related to U.S. Provisional Application No. 60/776,838, filed on Feb. 23, 2006; and U.S. patent application Ser. No. 11/277,486 filed on Mar. 24, 2006 and titled "Determining A Document Similarity Metric", both of which are incorporated by reference herein in their entirety.

BACKGROUND OF THE INVENTION

1. Field of the Invention

The present invention relates generally to document searching. In particular, the present invention is directed to identifying occurrences of a large number of search patterns in a large number of documents.

2. Description of Background Art

Multi-pattern searching is useful in many different applications, including data mining, editing, and security. One particular application that requires multi-pattern searching is the identification of known code fragments in a set of data files. This is useful, for example, to determine whether and to what extent open-source code has been integrated into an organization's proprietary code.

In "A Fast Algorithm For Multi-Pattern Searching," (S. Wu and U. Manber, "A FAST ALGORITHM FOR MULTI-PATTERN SEARCHING", Report TR-94-17, Department of Computer Science, University of Arizona, 1994), incorporated by reference herein in its entirety, Wu and Manber present an algorithm for quickly finding matches between online texts and multiple search patterns. Using that algorithm limits the number of search patterns that can be used, because the algorithm is designed to operate entirely in primary storage. Moving the data structures presented in that paper to secondary storage without modification results in undesirably—and for massive numbers of search patterns, impractically—poor performance.

Accordingly, what is needed are a system and method for multi-pattern searching that allows search pattern data to exist in secondary storage while maintaining good performance with hundreds of millions to billions of search patterns.

SUMMARY OF THE INVENTION

The present invention provides a system and method for massive multi-pattern searching. A preprocessing engine uses patterns from pattern files to populate data structures including a SUFFIX table, a PREFIX table and a PATTERN table. The SUFFIX table combines data conventionally stored in SHIFT and HASH tables. Linear residual pointers are used in the SUFFIX table to refer to corresponding segments in the PREFIX table. Each PREFIX table segment is sorted by a prefix hash in order to facilitate an interpolated binary search into a segment. A PATTERN table replaces the conventional PAT_POINT table, and includes a hash of each full pattern sorted and grouped into segments, with each segment corresponding to a suffix hash and prefix hash combination. Linear residual pointers in the PREFIX table are used to refer to corresponding segments in the PATTERN table. The PREFIX and PATTERN tables in one embodiment are kept in secondary storage, allowing potentially billions of patterns to be used, which is a much larger number than can be used in conventional methods.

Once preprocessing has been performed on the pattern files and the tables have been populated, a pattern analysis engine compares the patterns against one or more source files, identifying the patterns present in the source file, as well as their location in the file.

The present invention also includes a method for qualitatively describing the similarity of source files to pattern files. Source file matches identified by the multi-pattern searching method described above, or provided by a conventional pattern search method, are collated to determine which matches exist for each pattern file. A document similarity engine determines values for various additional metrics, including a coverage metric, indicating how much of a pattern file is found in a source file; a clustering metric, specifying how close to each other in a pattern file the found matches are located; a uniqueness metric, indicating how common a pattern is among multiple pattern files; and finally a document similarity metric, which is a composite indicator of how similar a target document is to the source document file.

BRIEF DESCRIPTION OF THE DRAWINGS

FIG. 7 illustrates a PATTERN table in accordance with an embodiment of the present invention.

FIG. 9 illustrates a screen shot of output produced, in accordance with an embodiment of the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
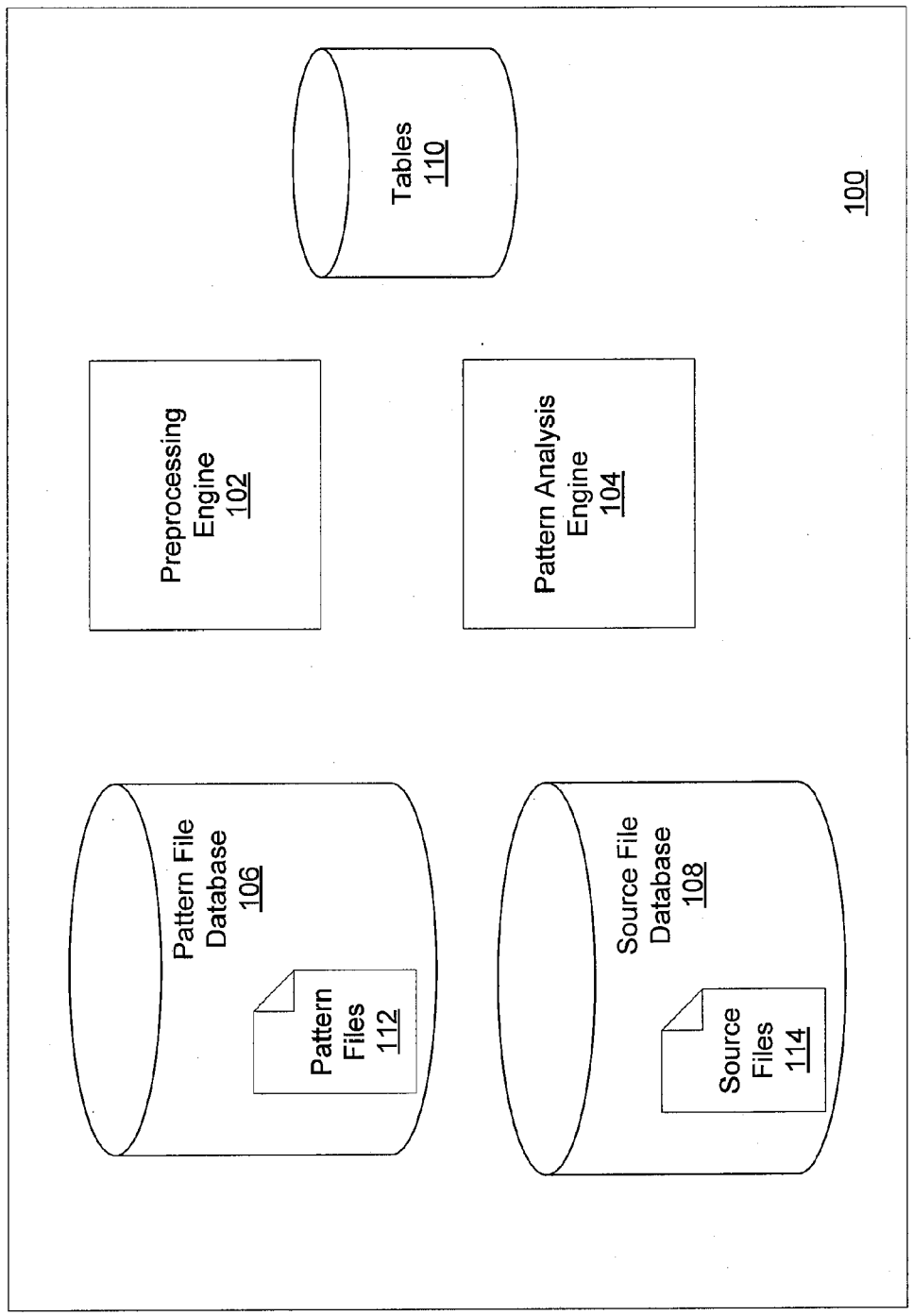
FIG. 1 is a block diagram of a system in accordance with an embodiment of the present invention.

FIG. 1 illustrates a system 100 for performing multi-pattern searching in accordance with an embodiment of the present invention. System 100 includes a pattern file database 106, for storing pattern files 112 having patterns that are to be matched against source documents; a source file database 108, for storing the source files 114; a preprocessing engine 102, for preprocessing pattern data and creating SUFFIX, PREFIX and PATTERN tables; a tables database 110 for storing the tables created by preprocessing engine 102; and a pattern analysis engine 104, for identifying instances of the patterns in the source data. Components of system 100 are described further below.

The conventionally-known Wu-Manber approach builds in turn on the Boyer-Moore string-matching algorithm, which proceeds as follows. Given a pattern of length m, compare the last character of the pattern against $t_m$, the m'th character of the text. If there is no match, then the algorithm determines the rightmost occurrence of $t_m$ in the pattern and shifts accordingly. For example, if $t_m$ does not appear in the pattern, then shift by m characters and look next at bin; if $t_m$ matches the 4th character of the pattern, then shift by m-4, etc. Wu and Manber noted that in natural language texts, shifts of approximately size m occur most of the time, leading to a very fast algorithm. Their method applies this idea to multi-pattern matching.

The Wu-Manber method first preprocesses the set of patterns. Three tables are built in a preprocessing stage: a SHIFT table, a HASH table, and a PREFIX table. The SHIFT table is used to determine how many characters in the text can be shifted (skipped) when the text is scanned. If the SHIFT table includes a value of 0, then the HASH and PREFIX tables are used to determine which pattern is a candidate for the match and to verify the match.

Figure 2:
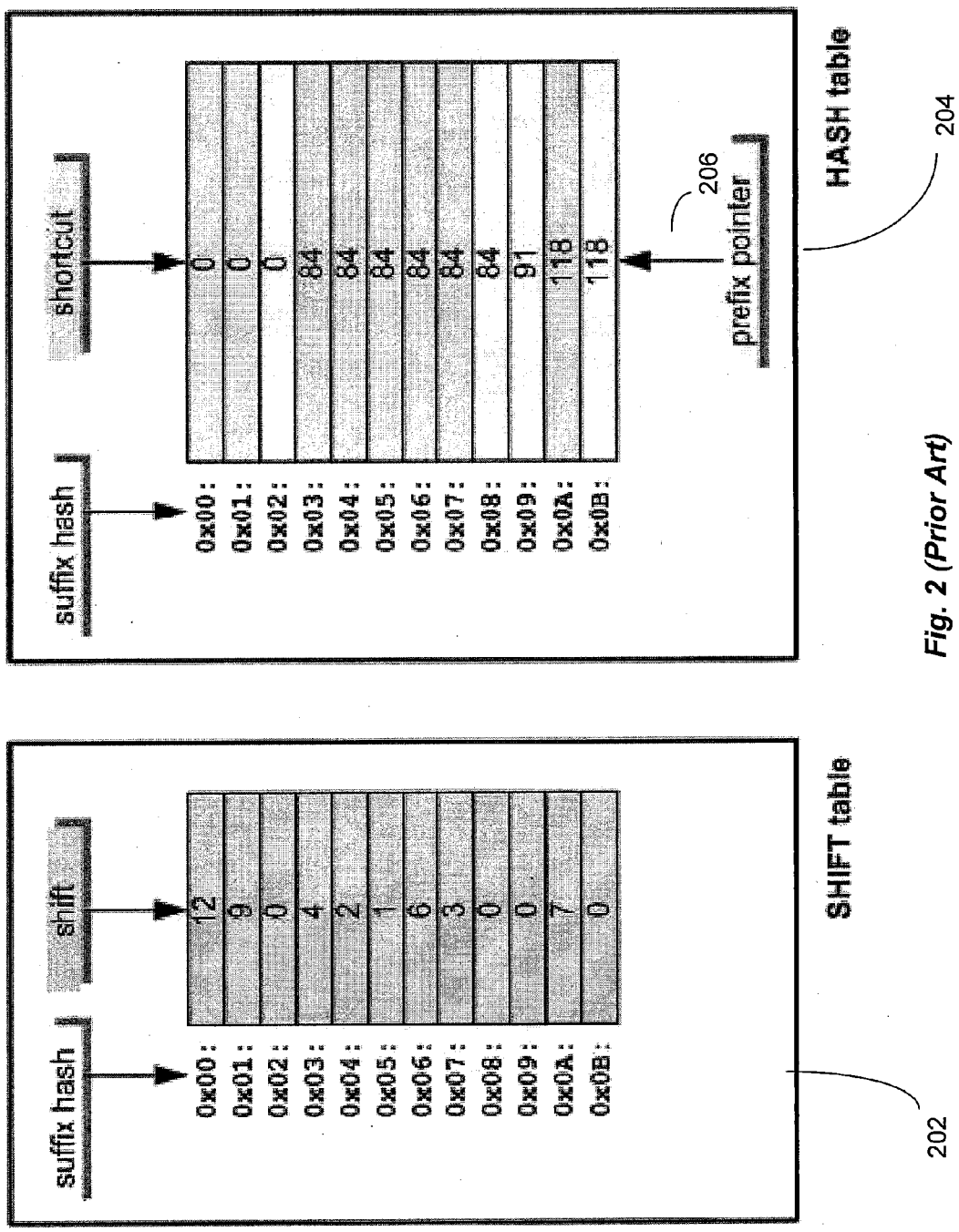
FIG. 2 illustrates conventional SHIFT and HASH tables.

FIG. 2 illustrates an example of a SHIFT table 202 and a HASH table 204 as used in the Wu-Manber method. Both the SHIFT table 202 and HASH table 204 contain one entry for each possible suffix hash value. If there is no search pattern with a particular suffix hash, then that SHIFT table entry holds the number of positions that can be skipped before reaching the next possible match. If there is a search pattern associated with a given suffix hash, then that position in the SHIFT table holds a zero to signify that further verification must be performed to identify a complete match. This further verification is performed using the corresponding HASH table 204 entry, which holds a pointer 206 into a PREFIX table 302, illustrated in FIG. 3, for the first entry with a particular suffix hash. In order to determine the last PREFIX table entry for a suffix hash, one could traverse the SHIFT table looking for the next zero and then subtract 1 from the value of the corresponding HASH table—or upon finding the end of the SHIFT table, subtract 1 from the size of the PREFIX table. As this method does not guarantee linear performance, Wu-Manber describe a shortcut whereby the unused space in the HASH table is filled with the next valid start pointer into the PREFIX table, allowing the scanning process to always find the end pointer by subtracting 1 from the HASH table entry immediately following the entry for a given suffix hash.

Figure 3:
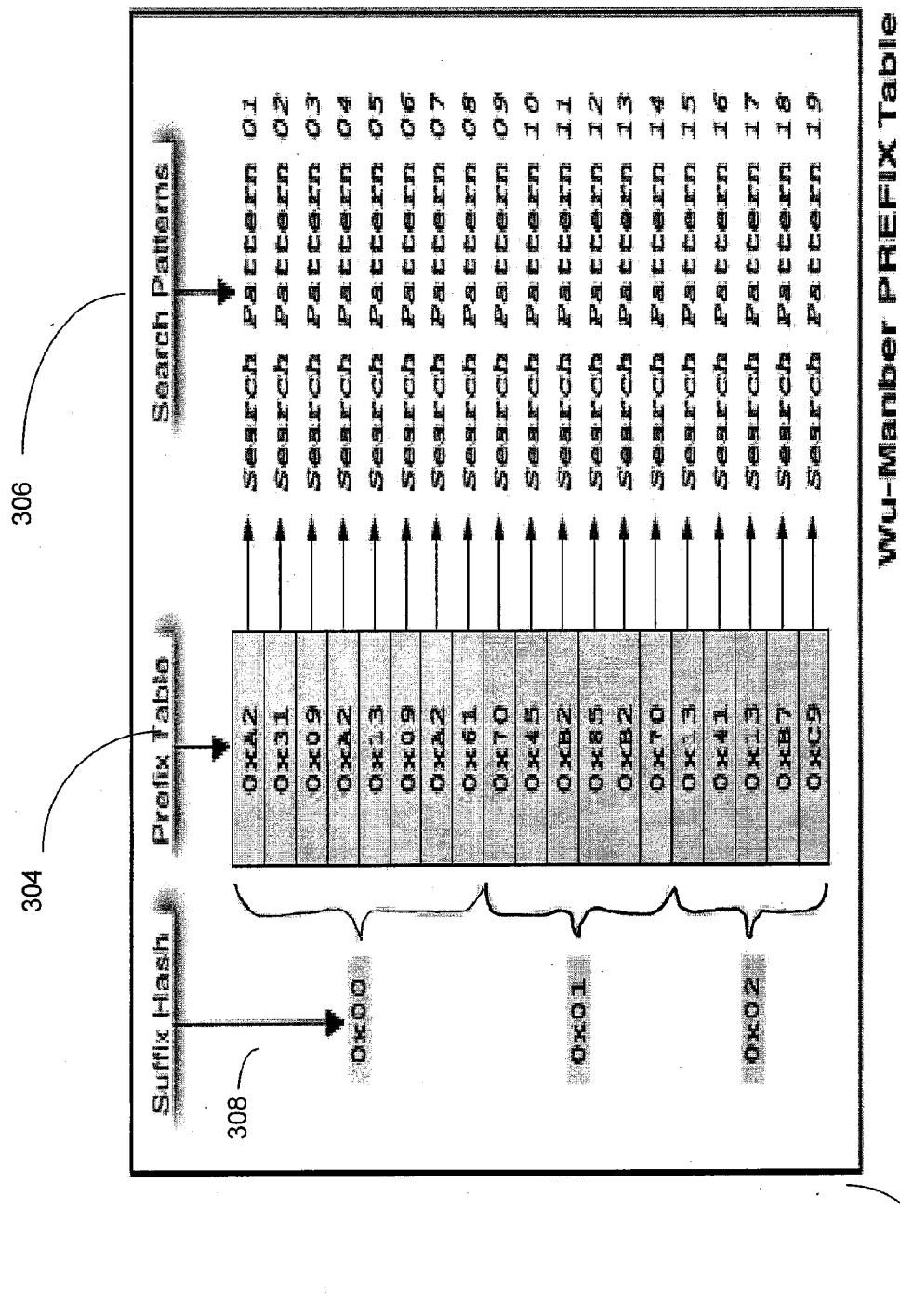
FIG. 3 illustrates a conventional PREFIX table.

Referring to FIG. 3, the PREFIX table 302 described by Wu-Manber has an entry 304 for every search pattern 306 and is kept entirely in memory. The entries are grouped by suffix hash 308, but are not further organized within suffix hash groups. In addition, several prefix table entries within a suffix hash group may share the same hash value.

As the number of search patterns increases, it becomes less practical to store the PREFIX table in memory. It also becomes more common for patterns to share both the same suffix hash and prefix hash. As a result, the Wu-Manber method becomes impractical and, eventually, unusable.

The SUFFIX Table

Figure 4:
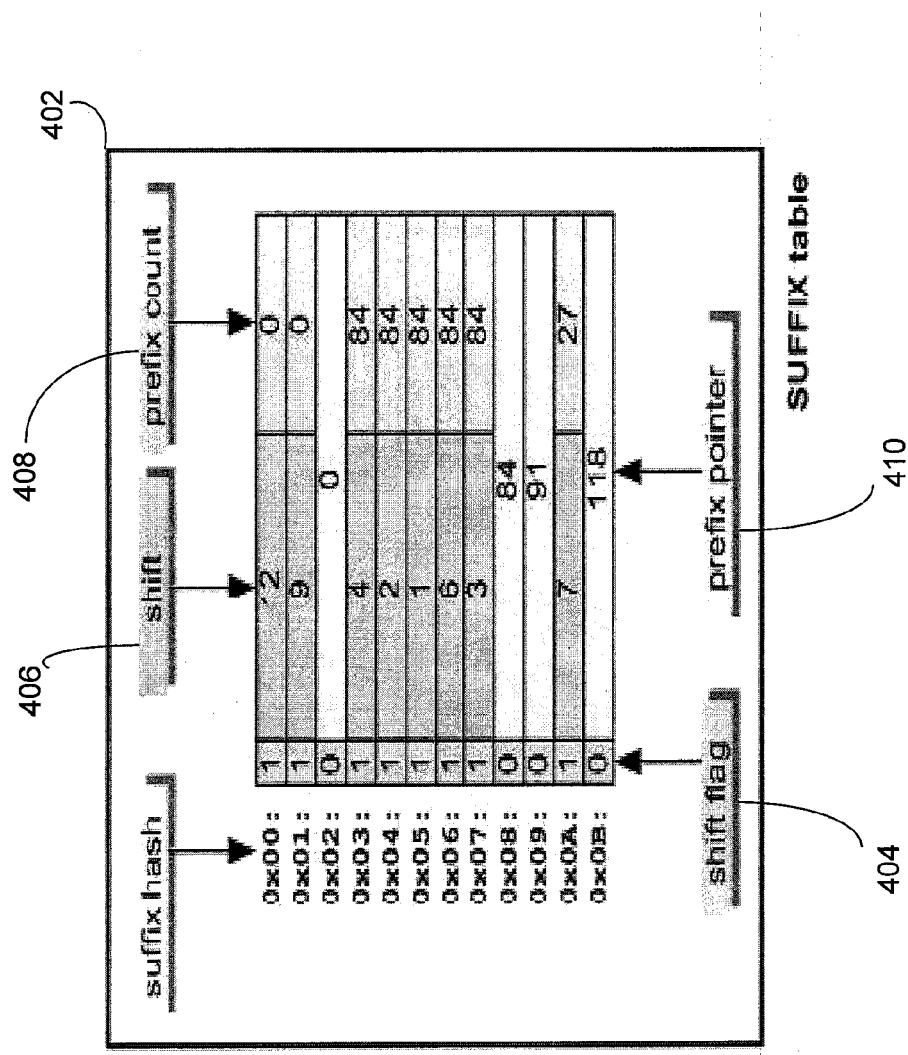
FIG. 4 illustrates a SUFFIX table in accordance with an embodiment of the present invention.

Since entries in the SHIFT table 202 and HASH table 204 with the same index hold different kinds of information for patterns with a given suffix hash, and since initially, before applying Wu-Manber's shortcut, HASH table entries are only meaningful when the corresponding SHIFT table entry is 0, system 100 combines the two tables as shown in FIG. 4 by adding a 1-bit shift flag 404 to each entry to signify whether the entry contains shift information or hash information. Shift values range from 0 to the size of the largest pattern, whereas prefix pointers range from 0 to the number of prefixes in the prefix table, i.e. the total number of unique prefixes for every suffix. Thus, since shift values are smaller than prefix pointers if the entry contains shift information, there is additional room left in the entry in which to store prefix count information 408 for preceding prefix pointer values 410.

As FIG. 4 illustrates, a value of "1" for the shift flag 404 of an entry indicates that the entry holds a shift value 406 and prefix count data 408; while a value of 0 indicates that the entry holds a pointer 410 to the first entry in the PREFIX table 602 for prefix hashes with that suffix hash. The width in bits of SUFFIX table 402 is preferably one bit for the shift flag 404, plus the greater of the number of bits required to hold the largest prefix pointer 410; or the number of bits required to hold the largest shift value 406 plus the number of bits required to hold the length of the longest PREFIX table count 408.

In one embodiment, the width of SUFFIX table 402 can be further reduced using linear residual pointers for the prefix pointers 410 instead of absolute pointers. As is known by those of skill in the art, linear residual pointers are useful in cases where data items in one structure, in this case SUFFIX table 402, refer to data items in another structure, in this case the PREFIX table 602, and furthermore, that the order in which the source data items are kept is somewhat relative to the order in which the target data items are kept. This regularity can be taken advantage of by determining a linear equation to which the regularity best fits, and then instead of storing an absolute reference from source to target, storing only the residual between an actual reference and the one predicted by applying the linear to the source data reference. These offsets can be stored using fewer bits when the source and target data types have a somewhat regular linear relationship, which is the case for PREFIX table pointers 410 in the SUFFIX table 402.

One formula for determining the linear residual target pointer $P_\Delta$ using a given scale S and intercept I for a given source pointer $P_s$ and target pointer $P_t$ is:

$$P_\Delta = P_t - \text{ceiling}(SP_s + I)$$

and conversely, a formula for determining the actual pointer for a given source and linear residual target pointer is:

$$P_t = P_\Delta + \text{ceiling}(SP_s + I).$$

Figure 5:
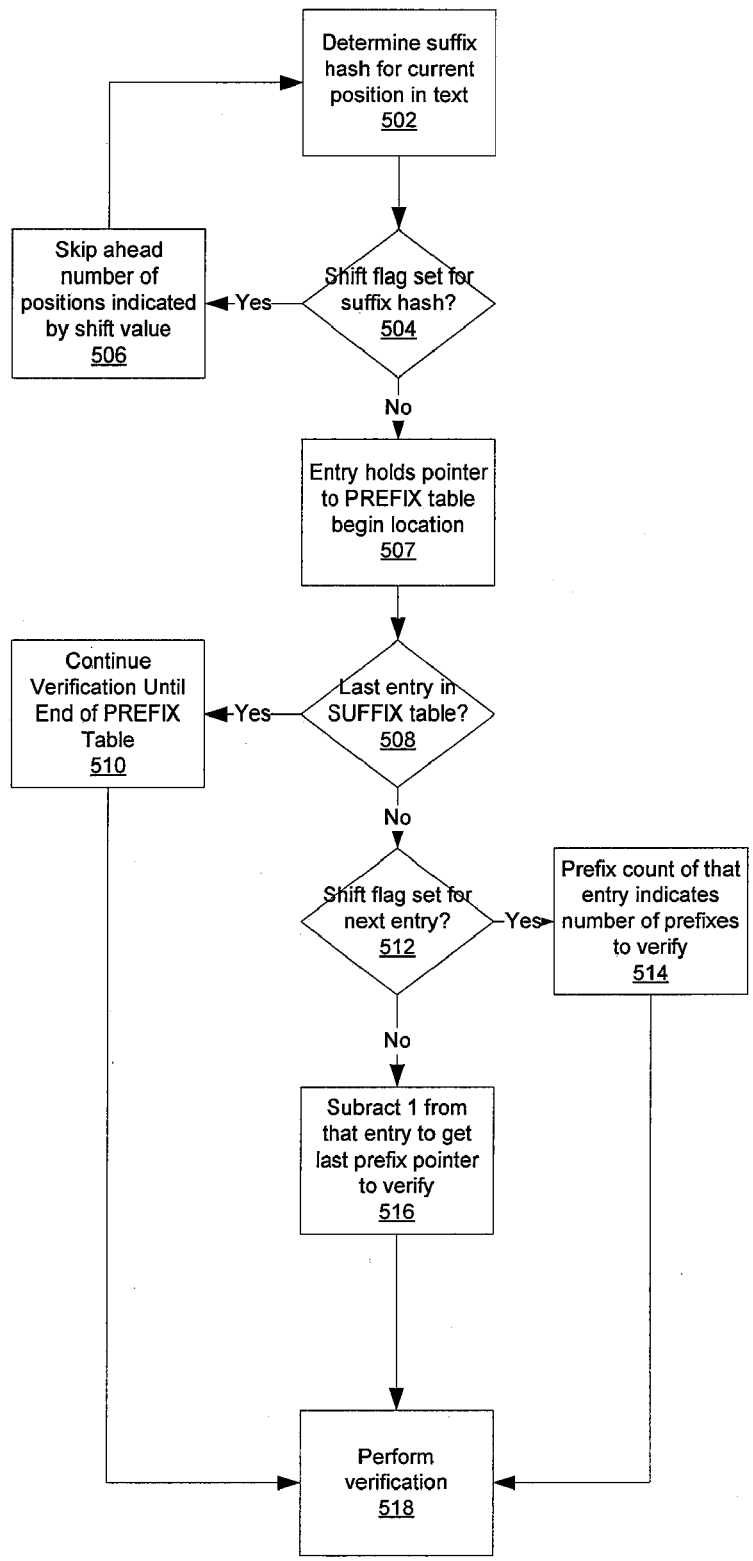
FIG. 5 is a flowchart illustrating a method for determining which prefixes should be verified against a selection from a source file in accordance with an embodiment of the present invention.

FIG. 5 illustrates a method for determining which prefixes in PREFIX table 602 (FIG. 6) should be verified against the current selection from the source file 108. First, pattern analysis engine 104 determines 502 a suffix hash for the current position in the text. If 504 the shift flag 404 is set for the entry in the SUFFIX table 402 corresponding to the determined suffix hash, then the entry holds a shift value and a prefix count, and pattern analysis engine 104 skips ahead 506 by the number of positions indicated by the shift value and returns to step 502.

If the shift flag 404 is not set for the entry, then 507 the entry holds a pointer into a location of the PREFIX table 602 where verification should begin. Pattern analysis engine 104 then determines the end point for verification.

If 508 the entry in the SUFFIX table 402 is the last entry, then the endpoint is set 510 to be the end of the PREFIX table. Otherwise, the shift flag for the subsequent entry in the SUFFIX table is examined. If 512 the shift flag for the subsequent entry in the SUFFIX table is set, then 514 the prefix count 408 of that entry indicates the number of prefixes to verify, and the endpoint is set that number of entries ahead of the current position. If the shift flag for the subsequent entry in the SUFFIX table is not set, then the prefix pointer of that entry indicates the start of the next prefix block, so the endpoint is set 516 by subtracting 1 from the prefix pointer of that entry. With the begin and endpoints determined, pattern analysis engine 104 performs 518 the verification.

The PREFIX Table

Figure 6:
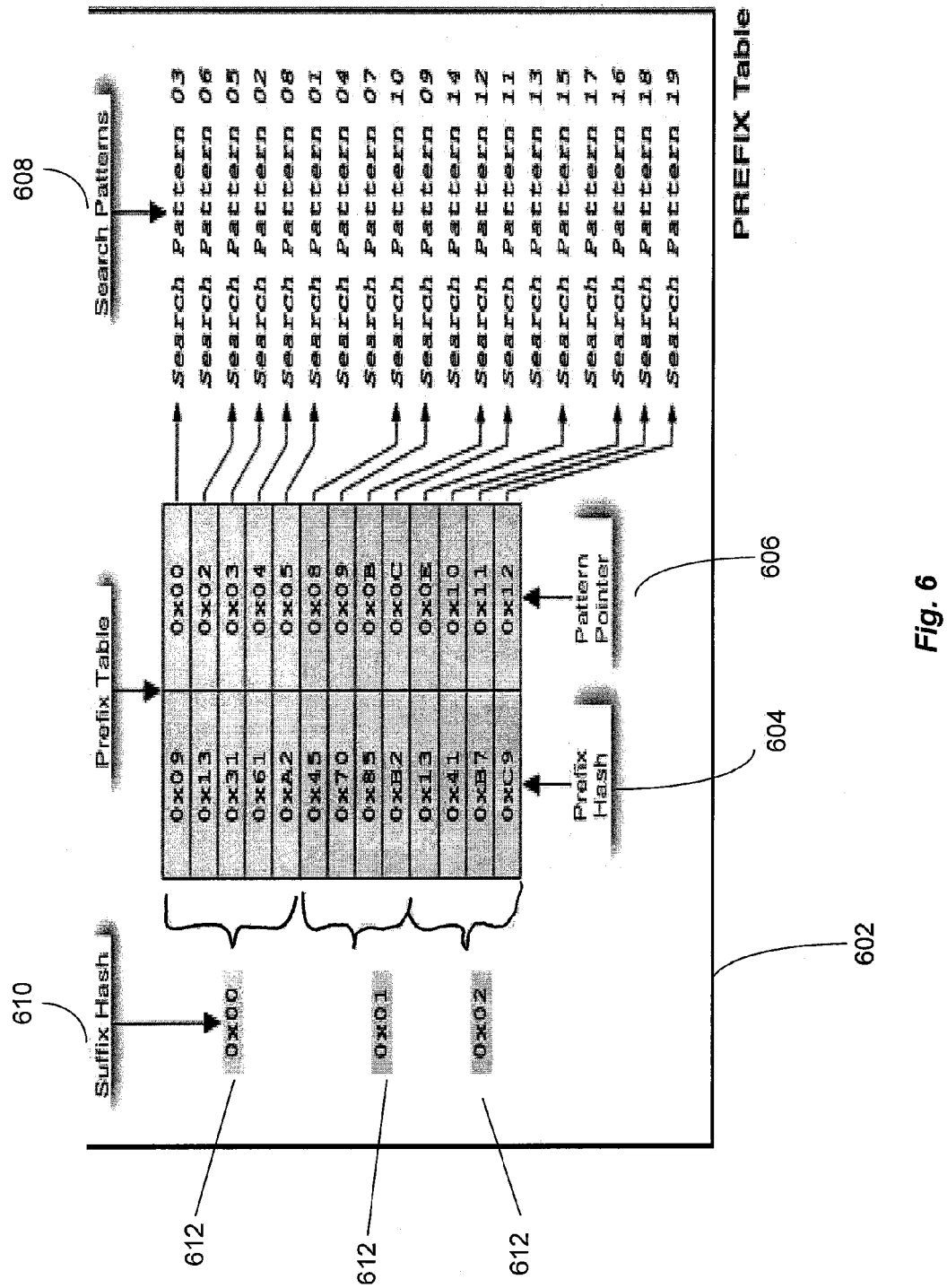
FIG. 6 illustrates a PREFIX table in accordance with an embodiment of the present invention.

Referring to FIG. 6, PREFIX table 602 of system 100 includes several improvements to the conventional PREFIX table design to accommodate storage on disk while reducing the number of disk reads to find matching patterns.

One advantage of the PREFIX table 602 of system 100 is that it allows for quicker, more direct searches for a particular prefix hash 604 within a suffix hash group. This is done by sorting by prefix hash value 604 the entries within each suffix hash group 612. Next, duplicate prefix hash values are eliminated. Finally, this shortened and reorganized PREFIX table is stored on disk along with pointers 606 to the search patterns 608 to which each PREFIX table entry corresponds. In order to find a matching pattern, the entire suffix hash group 612 can be loaded into memory and searched using a simple binary search for matching prefix hash. In cases where a suffix hash group is large, e.g., more than a couple thousand records, system 100 in one embodiment uses a paged interpolation search to reduce the number of reads required while still taking advantage of the sorted order and somewhat uniform distribution of the data. Paged integration searches are known in the art and are described, e.g., in Yehoushua Perl, Alon Itai, and Haim Avni, "Interpolation Search-A Log Log N Search," Volume 21 Number 7, Communications of the ACM 1978. The pattern pointers in one embodiment are further compressed by using linear residual pointers instead of absolute pointers into the pattern data.

The PATTERN table

Referring to FIG. 7, preprocessing engine 102 also creates a PATTERN table 702. PATTERN table 702 includes a hash 704 of each full pattern sorted and grouped into segments 708, each segment 708 corresponding to a suffix hash and prefix hash combination. As with the PREFIX table 602, this allows duplicate hashes to be eliminated. Further, since the hash values are sorted within the table, when a particular hash value lookup is needed into the table 702, only a section of the table including entries near the expected position of the entry being looked up need to be in memory. As a result, the table can be stored on disk, instead of having to remain in RAM allowing for a much larger table. Each entry in the table also includes pattern metadata 706, which includes the pattern itself, and preferably includes additional information such as each pattern file in which the pattern exists and its location in the file.

Once the relevant section of the table is loaded into memory, pattern analysis engine 104 performs an interpolated search and determines whether there is a match between the pattern and the data of the source file.

The multi-pattern search described above provides quantitative data relating to similarities between patterns in patterns database 106 and source files in source database 108. In addition, the system and method can be extended to provide a more qualitative analysis of those similarities.

First, a multi-pattern analysis is performed on the source file using a set of all search patterns of interest, with each pattern having a fixed size. Associated with each search pattern in a pattern file is a pattern identifier, a reference to the pattern file that the pattern is from, and the size of that pattern file.

Pattern analysis engine 104 in one embodiment produces a set of matches that are represented as pairs, for example (matchPosition, patternID), where matchPosition is the position of the match within the source document, and patternId is the search pattern identifier. This information is used by document similarity engine 812 as described below to establish a number of metrics and ultimately create a document similarity metric.

The following metrics are those used to create the document similarity metric in a preferred embodiment.

Count

The count metric is a count of search pattern matches between the source document and a particular pattern file. For each pattern match found, a counter associated with the pattern's pattern file is incremented.

Coverage

Coverage is a measure of how much of a particular pattern file exists in a source document. For example, if the pattern file is of length l, and each pattern is of size p, then there are l/p possible pattern matches in the pattern file. If there are c matches between the source file and that pattern file, then the coverage metric is $c/(l/p)$, i.e. the ratio of the number of matches actually found (the count metric, above) to the total matches that could theoretically have been found.

Clustering

A clustering metric describes an overall proximity of matches to each other. It is determined by calculating the standard deviation from the expected distance between matches, which is the pattern length, and that found. Algebraically, $$clustering = patternLength/(stddev(adjustedMatchOffsets) + patternLength)$$

where adjustedMatchOffsets is a vector of the matchPositions for a pattern file, adjusted by subtracting from each matchPosition_the preceding matchPosition+patternLength.

Uniqueness

A uniqueness metric describes how common a pattern is among the pattern files, which is an indication of how significant it is that the pattern has been found in the source file. If search patterns have been seen in every pattern file, then their existence in the source document is not as meaningful as if they were found only in one pattern file. Uniqueness is calculated as:

$$uniqueness = count/totalCount$$

where totalCount is the sum of the counts from all matching pattern files.

Code Rank

A document similarity metric, also known as a code rank, is a composite measure, determined using the metrics described above and normalized to fit within a range of 0 to 1:

$$codeRank = sqrt(coverage^2 + clustering^2 + uniqueness^2)/sqrt(3).$$

This composite measure produces a ranking whereby each matching pattern file can be scored. Weighting can be applied to each of the individual metrics as desired, and accounted for in the normalization. For example, in one example embodiment the coverage metric is weighted more heavily, and the equation becomes:

$$codeRank = sqrt((2 \times coverage)^2 + clustering^2 + uniqueness^2)/sqrt(6).$$

The square root function of the divisor normalizes the result.

The code rank metric is accordingly a measure of the similarity between the source document and a pattern file.

The code rank metric, as well as the coverage, clustering and uniqueness metrics, are useful in many applications, including applications that analyze computer programs, source code, and other components of computer programs. A source code fingerprint can be determined by scanning source code to assess whether it is wholly derived from, or includes portions of, third party code.

Code matches are preferably ranked so that a user can quickly assess what portions of his intellectual property are derived from third parties, and which have the greatest potential likelihood of impacting his business. Because the user can adjust matching thresholds to ignore matches below a threshold amount for each metric, he is able to perform an analysis that is as conservative as he desires.

Figure 8:
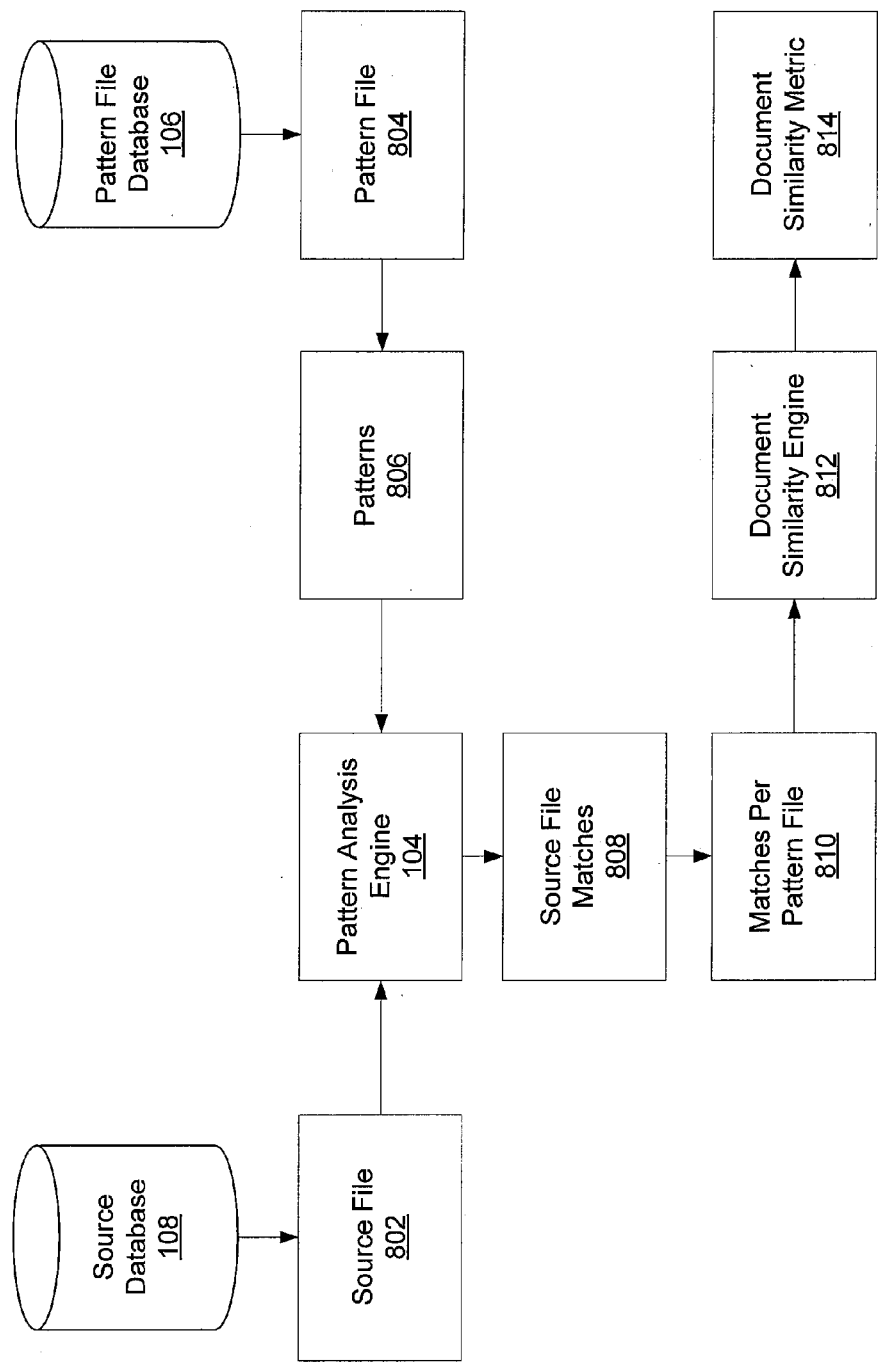
FIG. 8 illustrates a determination of a document similarity metric in accordance with the present invention.

FIG. 8 illustrates a determination of a document similarity metric. Source database 108 includes a source file 802 file that is to be analyzed. Although we describe analysis of a single source file, those of skill in the art will appreciate that multiple source files can be examined in a similar manner, and results can be aggregated across all scanned files or reported on a per-file basis. Pattern file database 106 includes one or more pattern files 804 that contain the patterns 806 of concern, i.e. the patterns to be evaluated for similarity to the source file 802.

Pattern analysis engine 104 performs a multi-pattern search as describe above, producing a list of matches 808 that identifies for each source file 802 which patterns 806 appear in the source file. This data is then collated to determine a set of matches 810 expressed on a per-pattern file 804 basis.

Document similarity engine 812 then determines the count, coverage, clustering and uniqueness metrics for each pattern file, as described above. Finally, document similarity engine 812 determines a document similarity metric 814 for each pattern file 804, indicative of how similar the source file is to the pattern file 802.

FIG. 9 is a screen shot of output produced in accordance with an embodiment of the invention. The output includes two regions—a report area 902 and a view pane 904. In the example shown, a source file 802, a portion of which is displayed in view pane 104, is being compared to various pattern files. The pattern files that best match the source file are listed in report area 902, along with the metrics for each of these metrics. Selecting one of the listed pattern files causes matching portions in the source file to be highlighted in viewing pane 904. In the illustrated example, a vertical bar 906 in the viewing pane 904 is a map that represents the entire source file from top to bottom. Shaded portions of the map 906 indicate regions that match the currently selected pattern file.

As will be appreciated by those of skill in the art, while the described embodiment for determining a document similarity metric takes as its input the source file matches 808 produced by pattern analysis engine 104, other matching algorithms can also be used, and the output of those algorithms taken as input by document similarity engine 812.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the fraud detection engine 212 and so forth may be provided in many or one module.

Some portions of the above description present the feature of the present invention in terms of algorithms and symbolic representations of operations on information. These algorithmic descriptions and representations are the means used by those skilled in the data searching arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality. It should be borne in mind, however, that all of these and similar terms are to be associated with the appropriate physical quantities and are merely convenient labels applied to these quantities.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for identifying patterns in a source document, comprising:
   for each of a plurality of patterns:
      storing in a suffix table a pointer to an entry in a prefix table, the suffix table indexed by a suffix hash of each pattern;
      storing in the prefix table a prefix hash of the pattern and a pointer to the pattern, the prefix table indexed and grouped by the suffix hash of the pattern;
      storing in a pattern table the pattern and a hash of the pattern;
      storing in the suffix table a plurality of shift values in entries to which none of the plurality of patterns hashes; and
   a processor determining which of the plurality of patterns appears in the source document, by analyzing the source document with reference to the suffix table, the prefix table and the pattern table.

2. A system for identifying patterns in a source document, the system comprising:
   a computer readable storage medium storing a plurality of patterns;
   a preprocessing engine configured to:
      for each of the plurality of patterns,
         store in a suffix table a pointer to an entry in a prefix table, the suffix table indexed by a suffix hash of each pattern;
         store in the prefix table a prefix hash of the pattern and a pointer to the pattern, the prefix table indexed and grouped by the suffix hash of the pattern;
         store in a pattern table the pattern and a hash of the pattern; and
         store in the suffix table a plurality of shift values in entries to which none of the plurality of patterns hashes;
   a pattern analysis engine, coupled to the preprocessing engine, configured to determine which of the plurality of patterns appears in the source document, by analyzing the source document with reference to the suffix table, the prefix table and the pattern table.

3. The method of claim 1, wherein analyzing the source document comprises:
   determining a suffix hash at a first position in the source document;
   determining presence of a shift value in the suffix table corresponding to the suffix hash; and
   proceeding to a second position in the source document separated from the first position by the shift value responsive to the shift value corresponding to the suffix hash.

4. The method of claim 3, wherein analyzing the source document further comprises:
   determining whether a prefix hash of a portion of the source document ending at the first position is present in the prefix table, responsive to the shift value corresponding to the suffix hash not being present in the suffix table;
   determining a candidate pattern from the prefix table based on the suffix hash and the prefix hash responsive to the prefix hash of the portion of the source document being present in the prefix table; and
   comparing the candidate pattern with the portion of the source document.

5. The method of claim 1, wherein the pointer in the suffix table comprises a linear residual pointer.

6. The method of claim 1, further comprising sorting entries of the prefix table by values of prefix hashes.

7. The method of claim 6, further comprising eliminating duplicative values of prefix hashes in the prefix table.

8. The method of claim 1, wherein analyzing the source document comprises performing paged interpolation searches on the prefix table.

9. The method of claim 1, further comprising sorting and grouping the patterns in the pattern table based on suffix hashes and prefix hashes of the patterns.

10. The method of claim 1, further comprising storing metadata of the patterns in the pattern table.

11. The system of claim 2, wherein the pattern analysis engine is further configured to:
    determine a suffix hash at a first position in the source document;
    determine presence of a shift value in the suffix table corresponding to the suffix hash; and
    proceed to a second position in the source document separated from the first position by the shift value responsive to the shift value corresponding to the suffix hash being present in the suffix table.

12. The system of claim 11, wherein the pattern analysis engine is further configured to:
    determine whether a prefix hash of a portion of the source document ending at the first position is present in the prefix table, responsive to the shift value corresponding to the suffix hash not being present in the suffix table;
    determine a candidate pattern from the prefix table based on the suffix hash and the prefix hash responsive to the prefix hash of the portion of the source document being present in the prefix table; and
    compare a candidate pattern with the portion of the source document.

13. The system of claim 2, wherein the pointer in the suffix table comprises a linear residual pointer.

14. The system of claim 2, wherein the preprocessing engine is further configured to sort entries of the prefix table by values of prefix hashes.

15. The system of claim 14, wherein the preprocessing engine is further configured to eliminate duplicative values of prefix hashes in the prefix table.

16. The system of claim 2, wherein the pattern analysis engine is further configured to perform paged interpolation searches on the prefix table.

17. The system of claim 2, wherein the preprocessing engine is further configured to sort and group the patterns in the pattern table based on suffix hashes and prefix hashes of the patterns.

18. The system of claim 2, wherein the preprocessing engine is further configured to store metadata of the patterns in the pattern table.

19. A computer readable storage medium storing instruction configured to identify patterns in a source document, the instructions when executed by a processor causing the processor to:
    for each of a plurality of patterns:
       store in a suffix table a pointer to an entry in a prefix table, the suffix table indexed by a suffix hash of each pattern;
       store in the prefix table a prefix hash of the pattern and a pointer to the pattern, the prefix table indexed and grouped by the suffix hash of the pattern;
       store in a pattern table the pattern and a hash of the pattern;

store in the suffix table a plurality of shift values in entries to which none of the plurality of patterns hashes; and determine which of the plurality of patterns appears in the source document, by analyzing the source document with reference to the suffix table, the prefix table and the pattern table.

20. The computer readable storage medium of claim 19, wherein the instructions to determine which of the plurality of patterns appears in the source document comprises instructions to:

determine a suffix hash at a first position in the source document;

determine presence of a shift value in the suffix table corresponding to the suffix hash; and proceed to a second position in the source document separated from the first position by the shift value responsive to the shift value corresponding to the suffix hash, responsive to the shift value.

* * * * *